(12) United States Patent
Praisner et al.

(10) Patent No.: US 9,976,433 B2
(45) Date of Patent: May 22, 2018

(54) GAS TURBINE ENGINE WITH NON-AXISYMMETRIC SURFACE CONTOURED ROTOR BLADE PLATFORM

(75) Inventors: Thomas J. Praisner, Tolland, CT (US); Eric A. Grover, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1521 days.

(21) Appl. No.: 12/753,211

(22) Filed: Apr. 2, 2010

(65) Prior Publication Data

US 2011/0243749 A1    Oct. 6, 2011

(51) Int. Cl.
*F01D 11/00* (2006.01)
*F01D 5/14* (2006.01)
*F01D 5/22* (2006.01)

(52) U.S. Cl.
CPC .......... *F01D 11/00* (2013.01); *F01D 5/143* (2013.01); *F01D 5/225* (2013.01); *F05D 2240/80* (2013.01); *F05D 2250/61* (2013.01); *Y02T 50/673* (2013.01)

(58) Field of Classification Search
CPC ...... F01D 11/00; F01D 11/001; F01D 11/004; F01D 5/143; F01D 5/142; F01D 9/02; F01D 9/047
USPC ..... 415/199.5, 173.1, 173.5, 116; 416/193 A
See application file for complete search history.

(56) References Cited

U.S. PATENT DOCUMENTS

| | | | |
|---|---|---|---|
| 2,918,254 A | 12/1959 | Hausammann | |
| 3,014,695 A * | 12/1961 | Rankin et al. | 416/220 R |
| 3,756,740 A * | 9/1973 | Deich et al. | 415/173.7 |
| 4,218,178 A | 8/1980 | Irwin | |
| 4,271,005 A | 6/1981 | Wright et al. | |
| 4,420,288 A | 12/1983 | Bischoff | |
| 4,677,828 A | 7/1987 | Matthews et al. | |
| 4,714,410 A * | 12/1987 | Hancock | 416/193 A |
| 5,044,885 A | 9/1991 | Odoul et al. | |
| 5,397,215 A | 3/1995 | Spear et al. | |
| 5,466,123 A | 11/1995 | Rose | |
| 5,601,404 A | 2/1997 | Collins | |
| 5,836,744 A * | 11/1998 | Zipps et al. | 416/193 A |
| 6,217,282 B1 | 4/2001 | Stanka | |
| 6,276,432 B1 | 8/2001 | Thompson et al. | |
| 6,343,912 B1 | 2/2002 | Manteiga et al. | |
| 6,413,045 B1 | 7/2002 | Dancer et al. | |
| 6,419,447 B1 * | 7/2002 | Watanabe et al. | 415/191 |
| 6,430,917 B1 | 8/2002 | Platts | |
| 6,431,820 B1 | 8/2002 | Beacock et al. | |
| 6,471,474 B1 | 10/2002 | Mielke et al. | |

(Continued)

FOREIGN PATENT DOCUMENTS

EP    1067273    1/2001
EP    1731711    12/2006

(Continued)

OTHER PUBLICATIONS

European Search Report for European Patent Application No. 11161072, dated Oct. 7, 2014.

*Primary Examiner* — Dwayne J White
(74) *Attorney, Agent, or Firm* — Carlson, Gaskey & Olds, P.C.

(57) ABSTRACT

A rotor blade for a gas turbine engine includes a platform section between a root section and an airfoil section, the platform section having a non-axisymmetric surface contour.

23 Claims, 9 Drawing Sheets

(56) References Cited

U.S. PATENT DOCUMENTS

| | | | |
|---|---|---|---|
| 6,510,889 B2 | 1/2003 | Thompson et al. | |
| 6,511,294 B1 * | 1/2003 | Mielke et al. | 416/193 A |
| 6,514,041 B1 | 2/2003 | Matheny et al. | |
| 6,524,070 B1 | 2/2003 | Carter | |
| 6,592,326 B2 | 7/2003 | Marx et al. | |
| 6,632,070 B1 | 10/2003 | Tiemann | |
| 6,641,360 B2 | 11/2003 | Beeck et al. | |
| 6,669,445 B2 | 12/2003 | Staubach et al. | |
| 6,672,832 B2 | 1/2004 | Leeke et al. | |
| 6,709,233 B2 | 3/2004 | Haller | |
| 6,761,536 B1 | 7/2004 | Bash et al. | |
| 6,821,087 B2 * | 11/2004 | Matsumoto et al. | 415/191 |
| 6,837,679 B2 | 1/2005 | Kawarada et al. | |
| 6,887,040 B2 | 5/2005 | Tiemann et al. | |
| 6,923,620 B2 | 8/2005 | Tiemann | |
| 6,932,577 B2 * | 8/2005 | Strohl et al. | 416/223 A |
| 6,991,428 B2 | 1/2006 | Crane | |
| 7,044,710 B2 * | 5/2006 | Naik et al. | 415/174.4 |
| 7,044,718 B1 | 5/2006 | Platts | |
| 7,059,835 B2 | 6/2006 | Tiemann | |
| 7,134,842 B2 | 11/2006 | Tam et al. | |
| 7,244,104 B2 * | 7/2007 | Girgis et al. | 416/193 A |
| 7,300,253 B2 | 11/2007 | Beeck et al. | |
| 7,384,243 B2 | 6/2008 | Noshi | |
| 7,452,184 B2 | 11/2008 | Durocher et al. | |
| 7,465,155 B2 | 12/2008 | Nguyen | |
| 7,467,922 B2 | 12/2008 | Beeck et al. | |
| 7,467,924 B2 | 12/2008 | Charbonneau et al. | |
| 7,481,614 B2 | 1/2009 | Tomita et al. | |
| 7,484,936 B2 | 2/2009 | Bouchard et al. | |
| 7,497,663 B2 | 3/2009 | McRae, Jr. et al. | |
| 7,540,709 B1 | 6/2009 | Ebert | |
| 7,581,930 B2 | 9/2009 | Aggarwala et al. | |
| 7,597,536 B1 | 10/2009 | Liang | |
| 7,600,972 B2 | 10/2009 | Benjamin et al. | |
| 7,607,889 B2 | 10/2009 | Baldauf et al. | |
| 7,625,172 B2 | 12/2009 | Walz et al. | |
| 7,628,578 B2 | 12/2009 | Barnet et al. | |
| 8,647,066 B2 | 2/2014 | Guimbard et al. | |
| 2005/0095128 A1 * | 5/2005 | Benjamin et al. | 416/97 R |
| 2005/0100439 A1 | 5/2005 | Greim et al. | |
| 2007/0031260 A1 * | 2/2007 | Dube et al. | 416/193 A |
| 2007/0243061 A1 * | 10/2007 | Taylor et al. | 415/173.7 |
| 2007/0269313 A1 * | 11/2007 | Nadvit et al. | 416/193 A |
| 2010/0074730 A1 * | 3/2010 | Liang | 415/173.4 |
| 2010/0080708 A1 | 4/2010 | Gupta et al. | |
| 2011/0052387 A1 * | 3/2011 | Kneeland et al. | 415/208.1 |

FOREIGN PATENT DOCUMENTS

| | | |
|---|---|---|
| EP | 1749970 | 2/2007 |
| EP | 2369138 | 9/2011 |

* cited by examiner

GAS TURBINE ENGINE WITH NON-AXISYMMETRIC SURFACE CONTOURED ROTOR BLADE PLATFORM

BACKGROUND

The present disclosure relates to a gas turbine engine, and more particularly to a reduction in purge air.

The core engine of a gas turbine engine typically includes a multistage axial compressor, a combustor and a high pressure turbine nozzle with one or more stages. Typical turbine nozzles, such as high pressure and low pressure turbine nozzles, define annular rings located adjacent to each turbine blade row to define axially alternate annular arrays of stator vanes and rotor blades.

To ensure that the rotatable blades and the static vane components do not contact each other under normal operating conditions, an annular gap is provided between the stator vanes and the bladed rotor. This requires, however, that the hot gases which pass through the turbine do not leak through the annular gap. Such leakage may result in a loss in turbine efficiency.

The conventional method to minimize hot gas leakage is the supply of high pressure purge air into the gap between the stator vanes and the bladed rotor. The purge air is directed radially outwardly over the surface of the rotatable disc and adjacent vane platform structure to exhaust through the gap into the core gas path. This minimizes hot gasses entrance into under-platform regions. These purge flows may cause some aerodynamic losses.

SUMMARY

A rotor blade for a gas turbine engine according to an exemplary aspect of the present disclosure includes a platform section between a root section and an airfoil section, the platform section having a non-axisymmetric surface contour.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a schematic view of an inner vane platform with an axial non-axi-symmetric surface contour on an;

DETAILED DESCRIPTION

Figure 1:
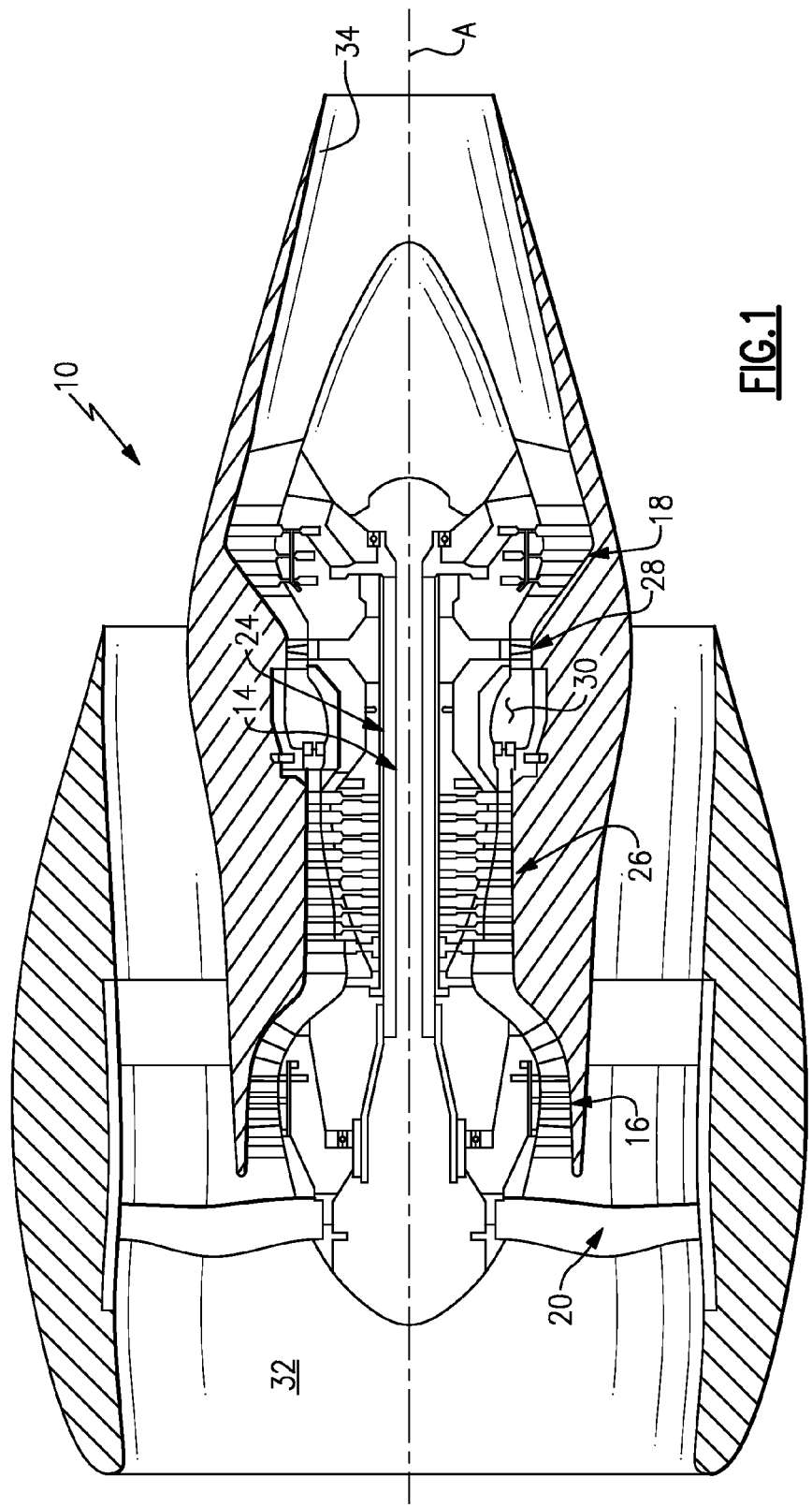
FIG. 1 is a general perspective view an exemplary gas turbine engine embodiment for use with the present disclosure.

FIG. 1 illustrates a general schematic view of a gas turbine engine 10 such as a gas turbine engine for propulsion. While a particular turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor section 30 is arranged between the high pressure compressor 26 and high pressure turbine 28. The low and high spools 14, 24 rotate about an engine axis of rotation A.

The gas turbine engine 10 functions in the conventional manner. Air drawn through an intake 32 is accelerated by the fan section 20 and divided along a bypass flow path and a core flow path. The bypass flow path bypasses the core engine section and is exhausted to atmosphere to provide propulsive thrust. The core flow path compresses the air in the compressor 16, 26, mixed with fuel and combusted in the combustor section 30. The resultant hot combustion products then expand through, and thereby drive the turbines 18, 28 before being exhausted to atmosphere through an exhaust nozzle 34 to provide additional propulsive thrust. The turbines 18, 28, in response to the expansion, drive the compressors 16, 26 and fan section 20.

Figure 2:
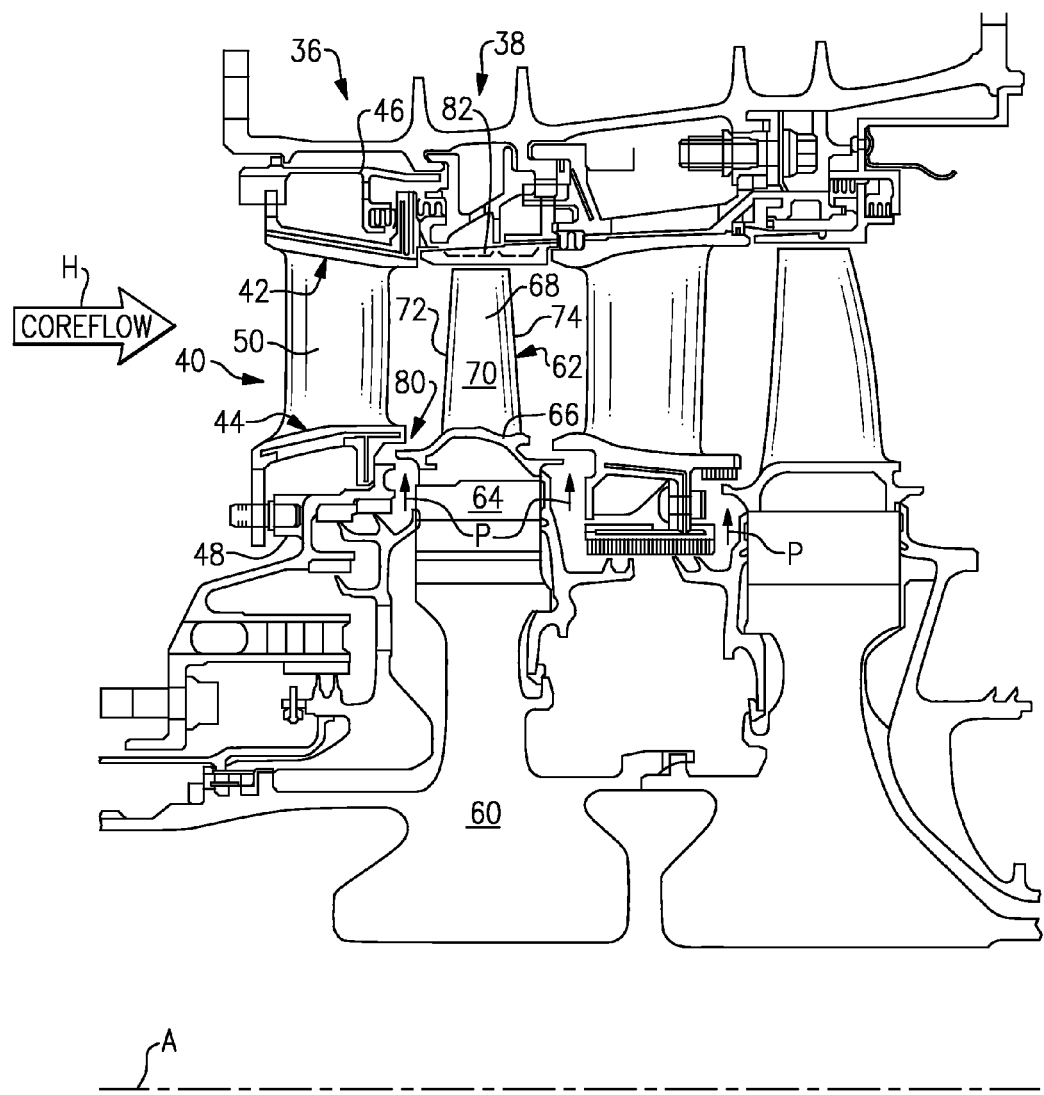
FIG. 2 is an expanded sectional view of a turbine section of the gas turbine engine.

Referring to FIG. 2, a stator portion 36 and a rotor portion 38 define a stage of the turbine section 18, 28. In the illustrated embodiment and for purposes of a detailed example, a single stage with the stator 36 and the rotor 38 will be described herein as being disposed within a turbine section. It should be understood, however, that this application is not limited to the turbine sectional alone and may be utilized within other sections such as the fan section and compressor section as well as every stage within each section.

That stator portion 36 includes an outer vane platform 42 and an inner vane platform 44 radially spaced apart from each other. The arcuate outer vane platform 42 may form a portion of an outer core engine structure 46 and the arcuate inner vane platform 44 may form a portion of an inner core engine structure 48 to at least partially define an annular turbine nozzle core gas flow path.

Figure 3:
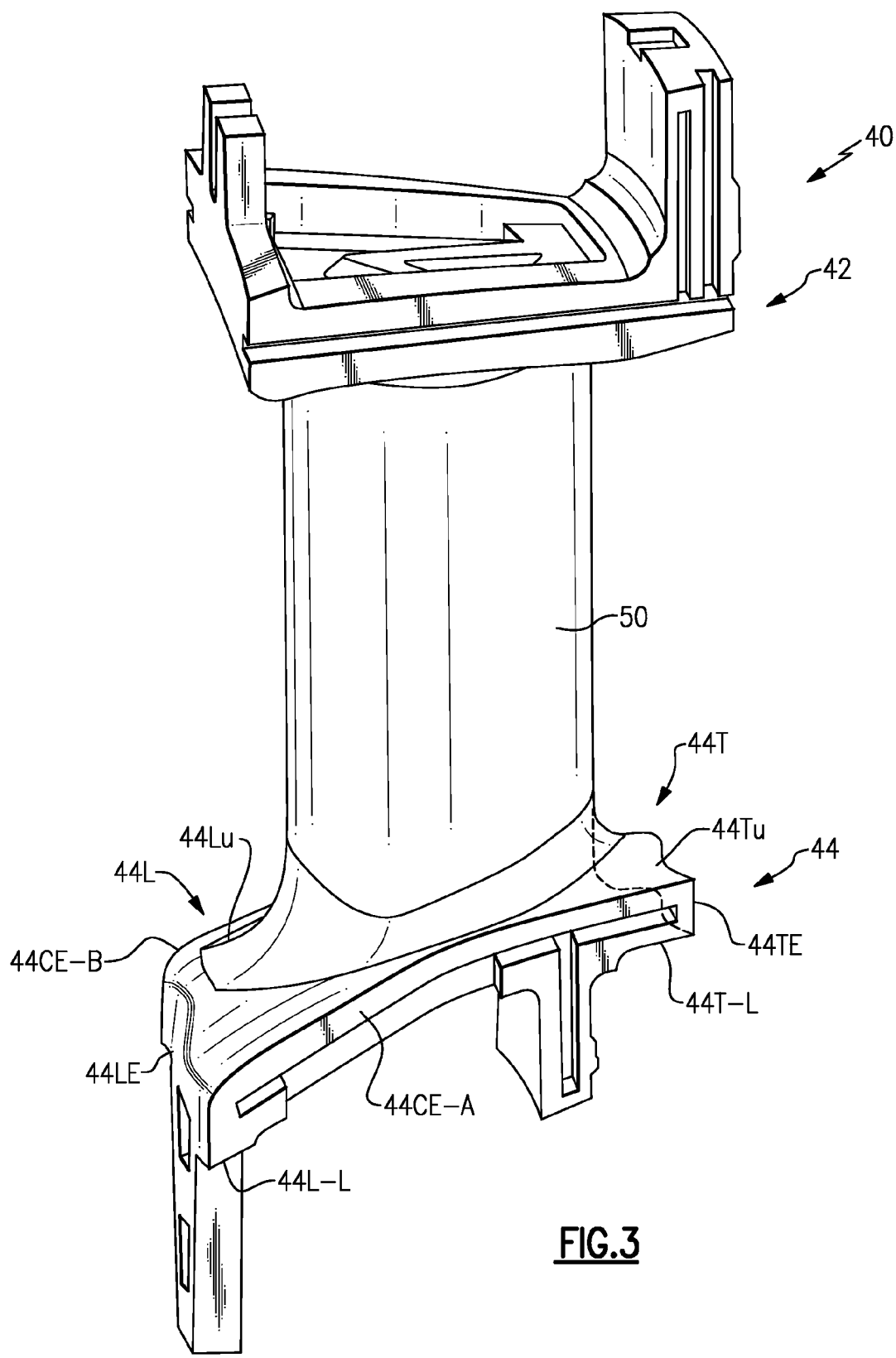
FIG. 3 is an expanded perspective view of a turbine stator vane segment.
Figure 4:
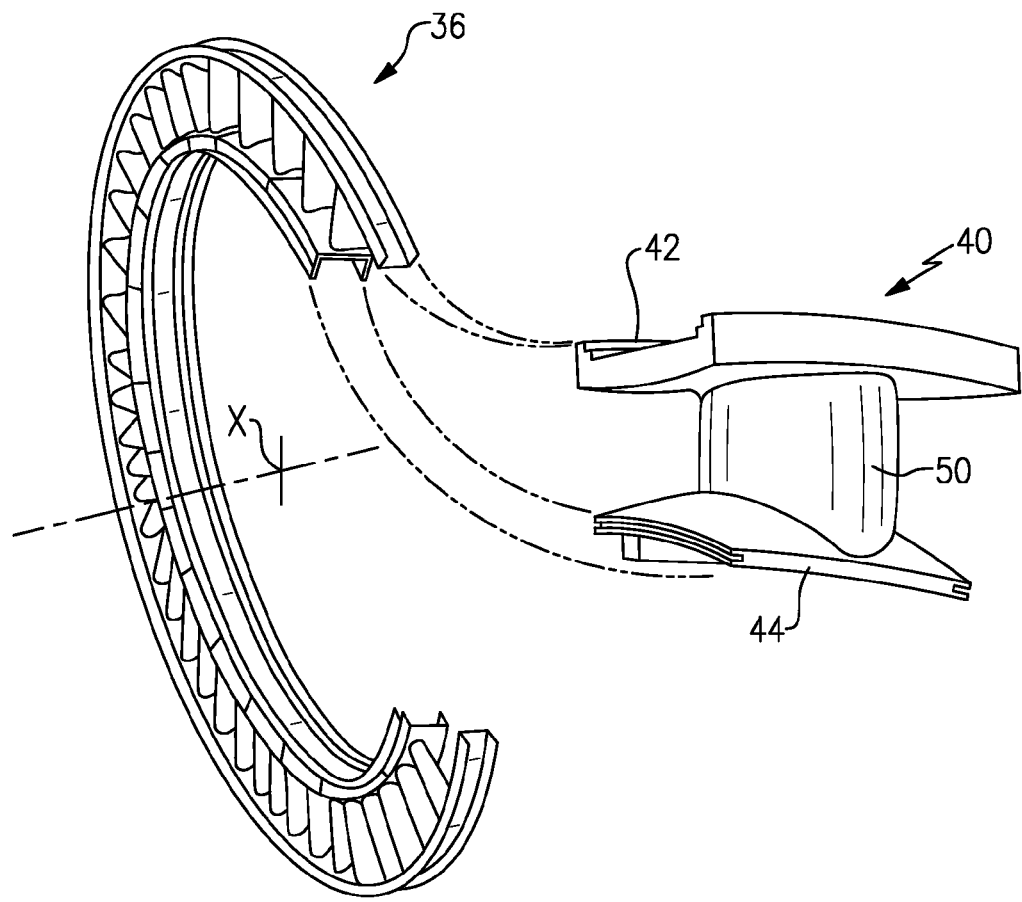
FIG. 4 is an expanded view of a stator vane portion of one turbine stage within a turbine section of the gas turbine engine.

Each circumferentially adjacent vane platform 42, 44 thermally uncouple each adjacent nozzle segments 40 (FIG. 3). That is, the temperature environment of the turbine section 18 and the substantial aerodynamic and thermal loads are accommodated by the plurality of circumferentially adjoining nozzle segments 40 which collectively form a full, annular ring about the centerline axis A of the engine (FIG. 4). Although a nozzle segment 40 for a turbine nozzle are illustrated in the disclosed embodiment, it should be understood that other nozzle sections such as compressor nozzle sections may also benefit herefrom.

Each nozzle segment 40 may include one or more circumferentially spaced turbine vanes 50 which extend radially between the vane platforms 42, 44. That is, the full, annular nozzle ring formed by the multiple of nozzle segments 40 provide the stator portion 36 of one stage in the turbine section 18.

Figure 5:
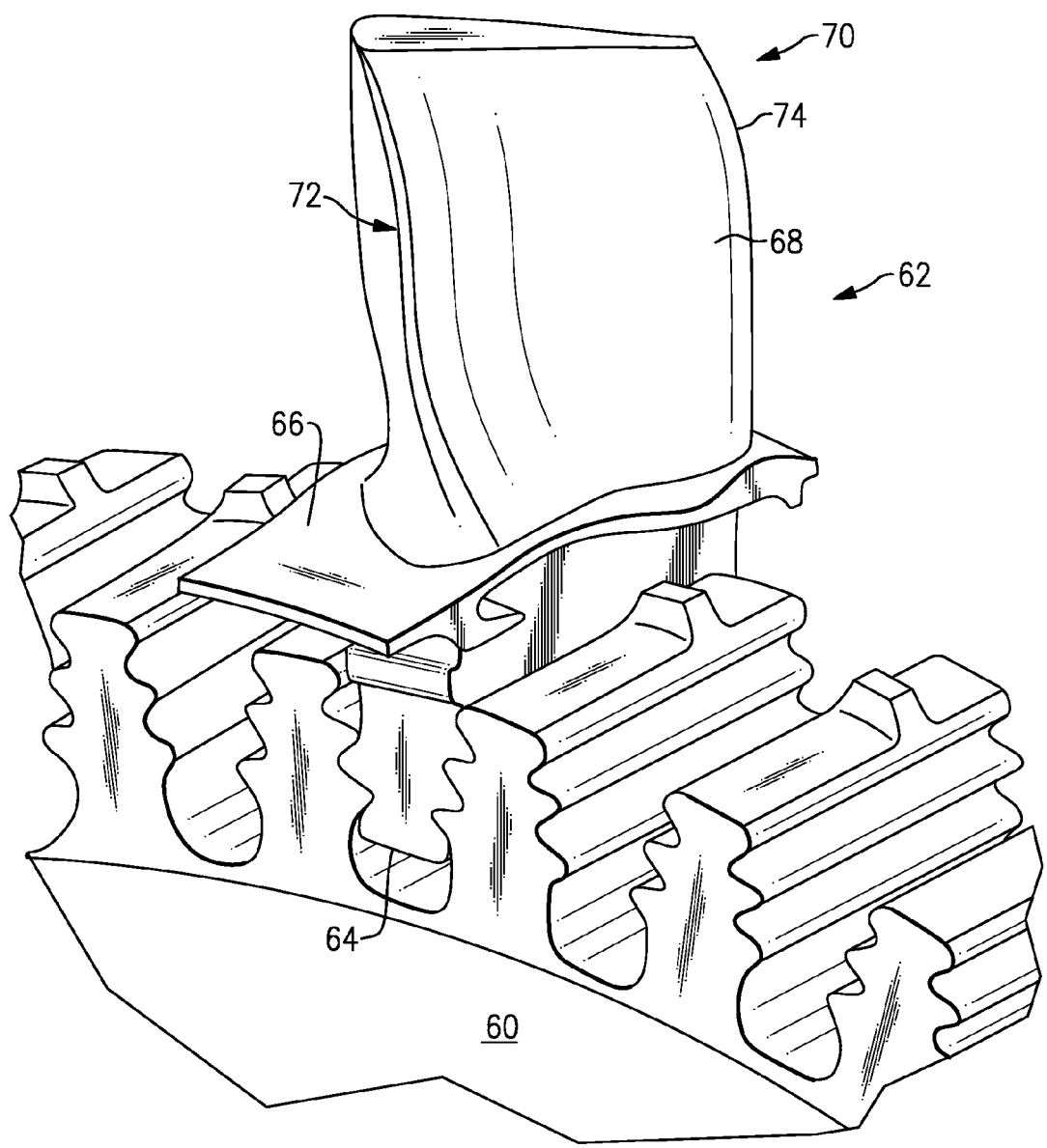
FIG. 5 is an expanded perspective view of a turbine rotor section.

The rotor portion 38 generally includes a rotor disk 60 which receives a multiple of rotor blades 62 (also illustrated in FIG. 5). Each rotor blade 62 includes a blade root section 64, a blade platform section 66, and a blade airfoil section 68, the blade platform section 66 between the blade root section 64 and the blade airfoil section 68. The blade root section 64 is fit into a corresponding slot of the turbine rotor disk 60. The blade airfoil section 68 is defined by an outer airfoil surface 70 between a leading edge 72 and a trailing edge 74.

Typically, cooling air is directed to the interiors of both the turbine vanes 50 and blade airfoil section 68 in a conventional manner. The cooling air provides internal and film cooling. Since the stator portion 36 is static relative the rotor portion 38, a clearance gap 80 is necessarily provided therebetween. The gap 80 is arranged to be as small as possible in order to minimize the hot combustion products H which may flow through the gap 80 and negatively effect the static structure 48 and the rotor disk 60.

The hot combustion products H flow along the turbine vanes 50 and the blade airfoil section 68 within radial inner and outer annular boundaries defined by the vane platforms 42, 44, the blade platform section 66 and an outer static structure 82 outboard of the rotor blades 62. The relatively cooler high pressure purge airflow P pressurizes the cavity under the inner vane platform 44 and under the blade platform section 66. The inner vane platform 44 and the blade platform section 66 are typically at least partially overlapped in the axial flow direction of the hot combustion products H.

Although tight tolerances are maintained at the gap 80, variation occurs axially as the engine 10 expands and contracts over typical engine operating cycles. The purge airflow P exits through the gap 80 in a radially outward direction as indicated by the arrows. The pressure of the purge airflow P outward through the gap 80 is higher than the highest pressure of the hot combustion products H to prevent the hot combustion products H from a negative effect upon the static structure 48 and the rotor disk 60.

The static pressure of the hot combustion products H in the core flow path conventionally varies circumferentially. The purge airflow P may cause inefficiencies in proportion to the non-axisymmetric pressure fields of the hot combustion products H which may have circumferentially non-uniform flow fields adjacent the gaps 80. Were the hot combustion products H flow fields to have perfectly uniform pressures in the circumferential direction, the necessity for the purge airflow P would be essentially eliminated.

The inner vane platform 44 and the blade platform section 66 disclosed herein provide non-axisymmetric surface features to a leading portion 44L, 66L, a trailing portion 44T, 66T and various combinations thereof to counteract the non-uniform (circumferentially) static-pressure distortions engendered by hot combustion products H to reduce purge-flow requirements and also reduce aerodynamic losses.

Figure 6:
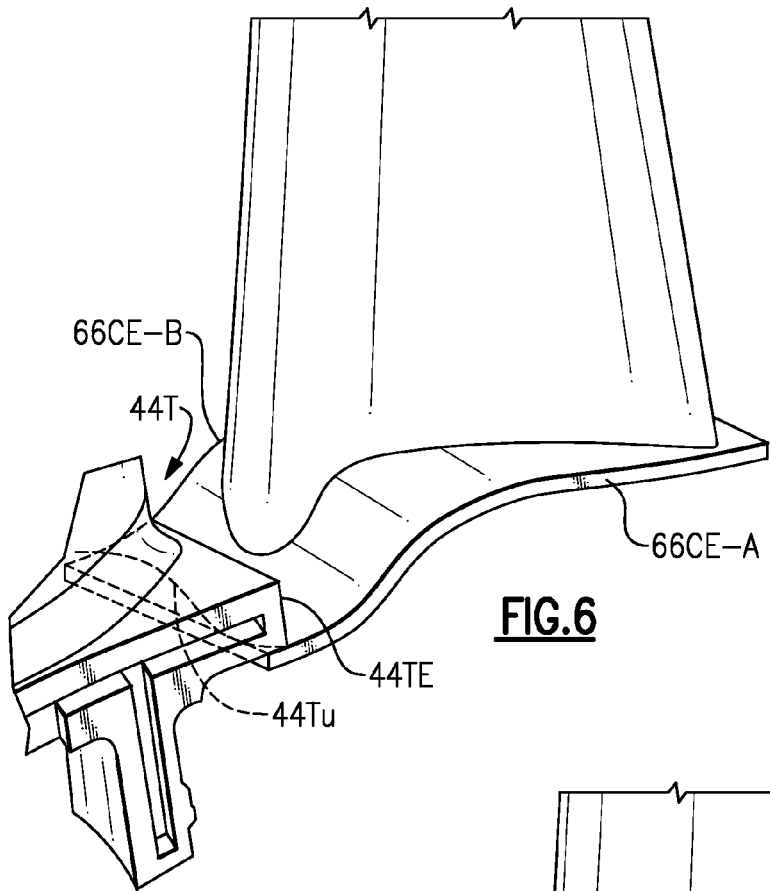
FIG. 6 is a schematic view of an inner vane platform with an radial non-axi-symmetric surface contour.

Referring to FIG. 3, the trailing portion 44T is contoured in a radial direction on an undersurface 44T-L. The undersurface 44T-L may, in one non-limiting embodiment, be contoured to provide a non-axisymmetric surface such as a waveform surface (FIG. 6). An upper surface 44Tu of the trailing portion 44T may define a conventional axisymmetric surface. Alternatively, or in addition thereto, the undersurface 44L-L of the leading portion 44L may also be so contoured in a radial direction. As illustrated schematically in FIGS. 3, 6, and 7, the platform 44 has a leading edge 44LE, a trailing edge 44TE, and two circumferentially spaced edges 44CE-A and 44CE-B. The term non-axisymmetric is defined as not symmetric about an axis extending from the leading edge 44LE to the trailing edge 44TE of the platform 44.

Figure 7:
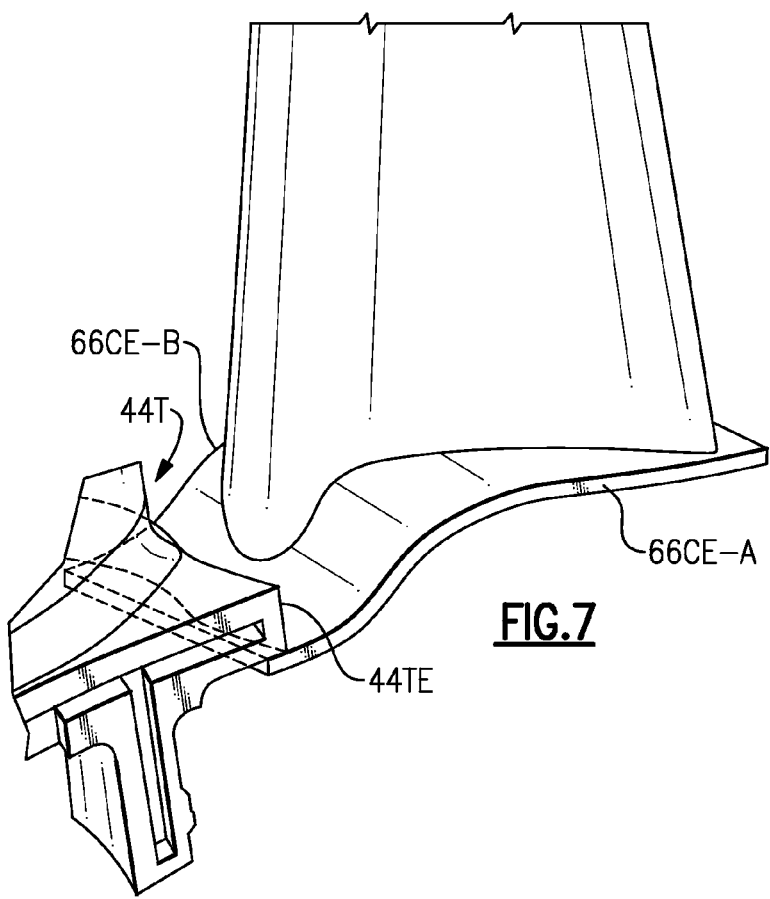

The trailing portion 44T may also be contoured in an axial direction on a trailing edge 44TE (FIGS. 3 and 7). The trailing edge 44TE may, in one non-limiting embodiment, be contoured to provide a non-axisymmetric surface such as a waveform surface (FIG. 7). Alternatively, or in addition thereto, a leading edge 44LE may also be so contoured in an axial direction (FIG. 3).

It should be understood that the non-axisymmetric radial surface contour undersurface 44T-L of the trailing portion 44T, the non-axisymmetric radial surface contour undersurface 44L-L of the leading portion 44L, the non-axisymmetric axial surface contour of the trailing edge 44TE, and the non-axisymmetric axial surface contour of the leading edge 44LE may be combined in various manners in relation to the hot combustion products H to reduce purge-flow requirements and also reduce aerodynamic losses. For example, the non-axisymmetric radial surface contour undersurface 44T-L of the trailing portion 44T, the non-axisymmetric radial surface contour undersurface 44L-L of the leading portion 44L, the non-axisymmetric axial surface contour of the trailing edge 44TE, and the non-axisymmetric axial surface contour of the leading edge 44LE may all be utilized together.

Figure 8:
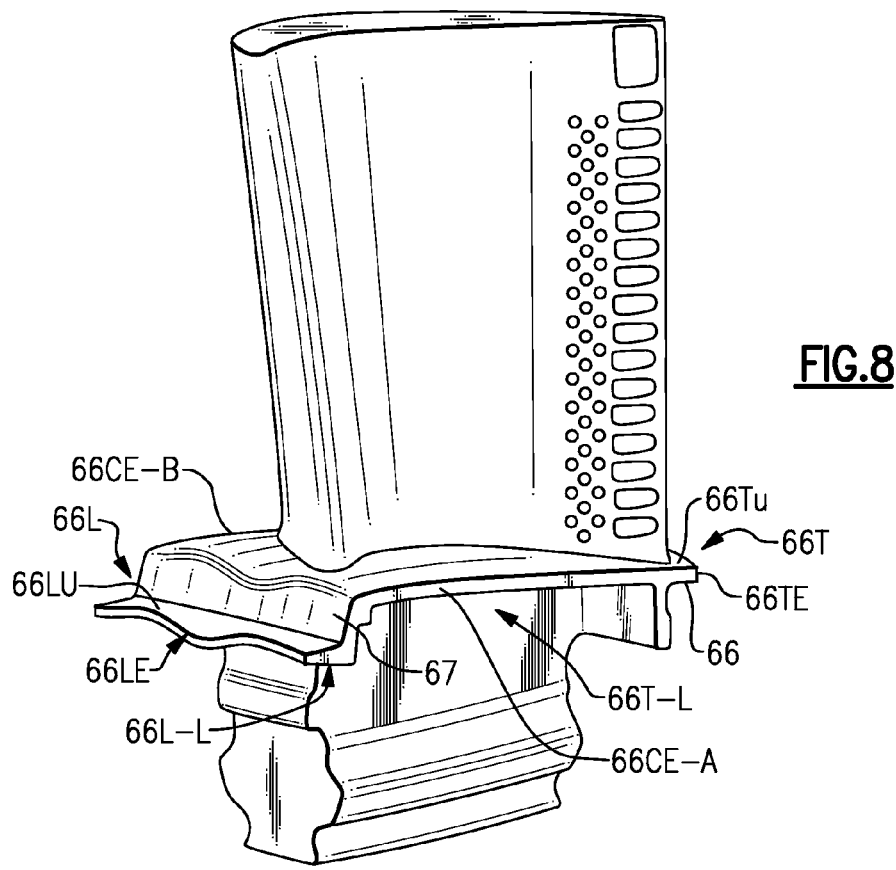
FIG. 8 is a perspective view of a turbine rotor blade.
Figure 9:
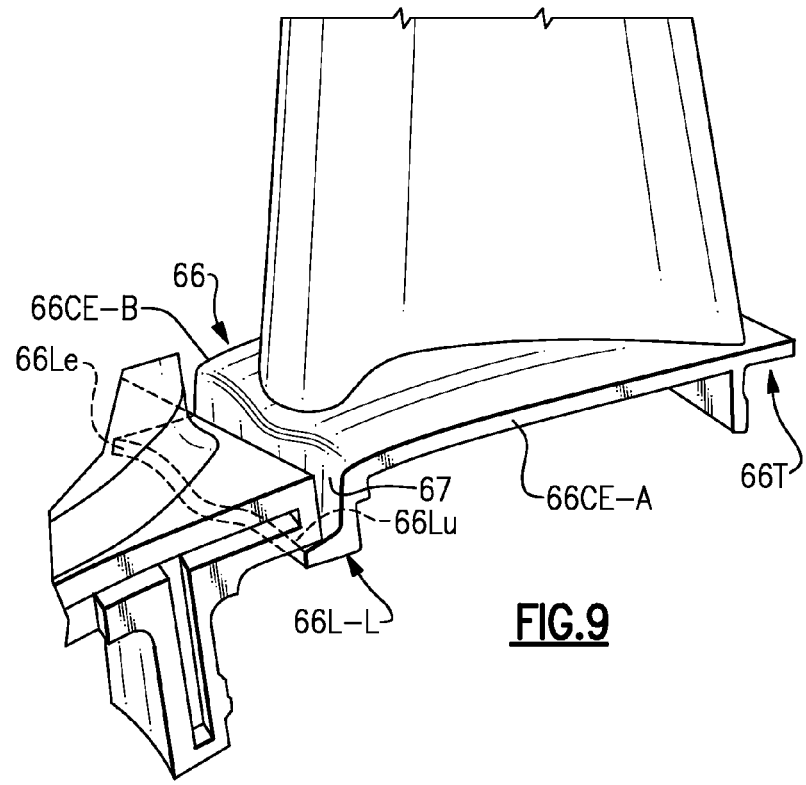
FIG. 9 is a schematic view of a rotor blade with a radial non-axi-symmetric surface contour on a platform thereof.
Figure 10:
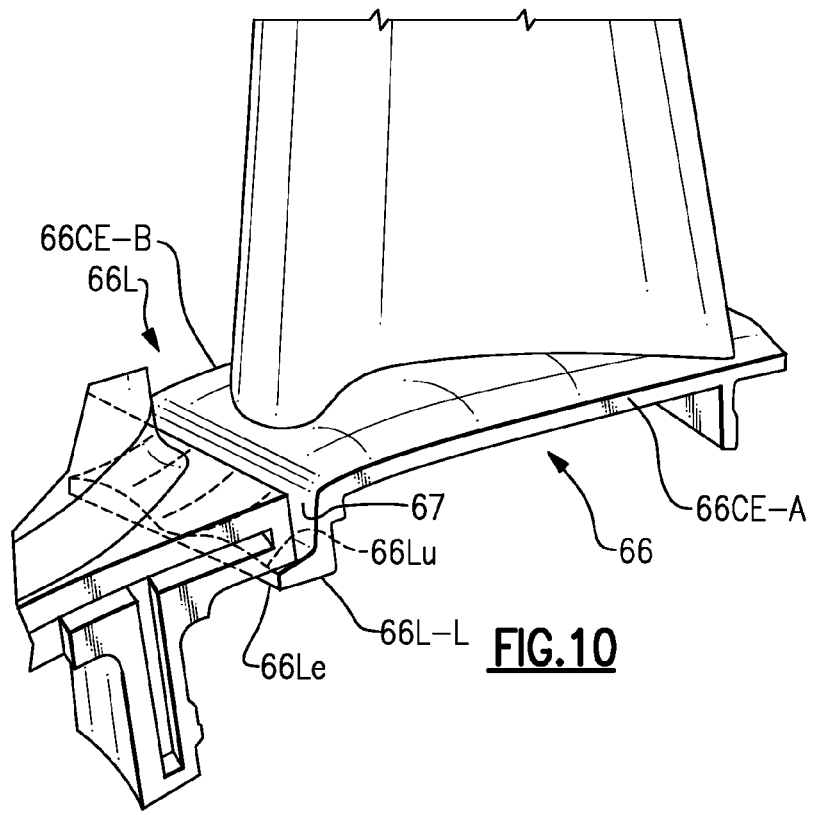
FIG. 10 is a schematic view of another embodiment of a rotor blade with a radial non-axi-symmetric surface contour on a platform trailing edge.
Figure 11:
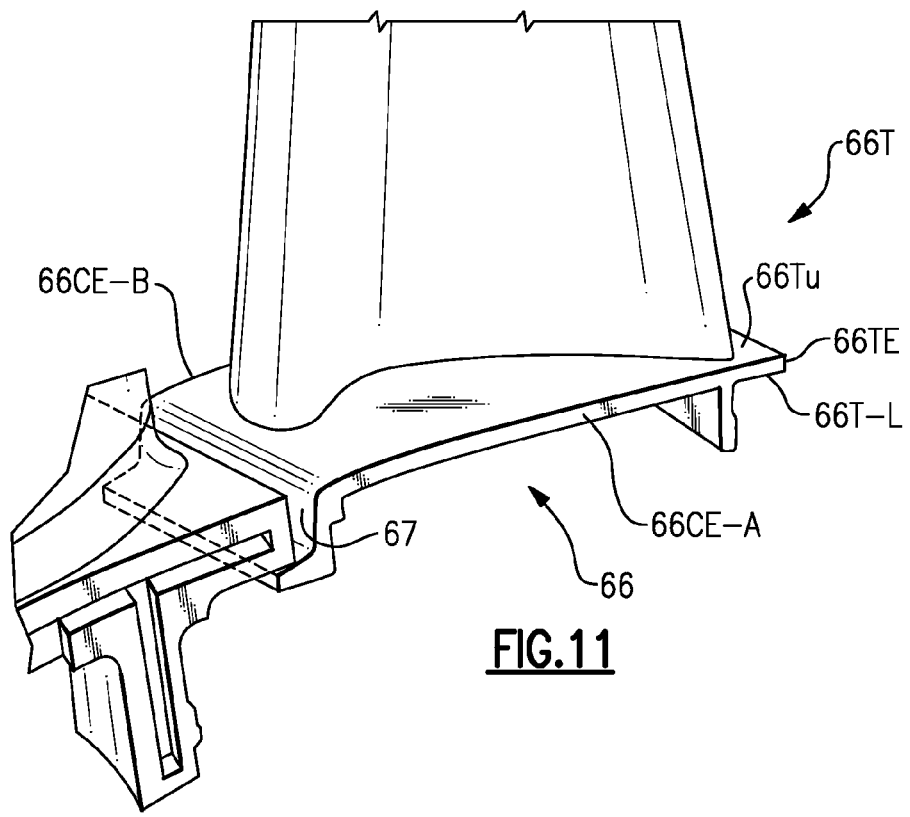
FIG. 11 is a schematic view of a stator vane portion with an axial non-axi-symmetric surface contour on a platform trailing edge.

Referring to FIG. 8, the leading portion 66L of the blade platform section 66 may be contoured in a radial direction. The leading edge 66LE may, alternatively or additionally, be contoured to provide an axial non-axisymmetric surface such as a waveform surface (FIG. 9). In this non-limiting embodiment, the entire platform leading edge 66LE forms the wave-like shape. A lower surface 66L-L and or the upper surface 66Lu of the leading portion 66L may define either a conventional axisymmetric surface or be contoured to provide a non-axisymmetric surface such as a waveform surface (FIG. 10). Alternatively, or in addition thereto, the undersurface 66T-L of the trailing portion 66T may also be so contoured in a radial direction (FIG. 11).

As illustrated schematically in FIGS. 8-12, the platform 66 has a leading edge 66LE, a trailing edge 66TE, and two circumferentially spaced edges 66CE-A and 66CE-B. The term non-axisymmetric is defined as not symmetric about an axis extending from the leading edge 66LE to the trailing edge 66TE of the platform 66.

Figure 12:
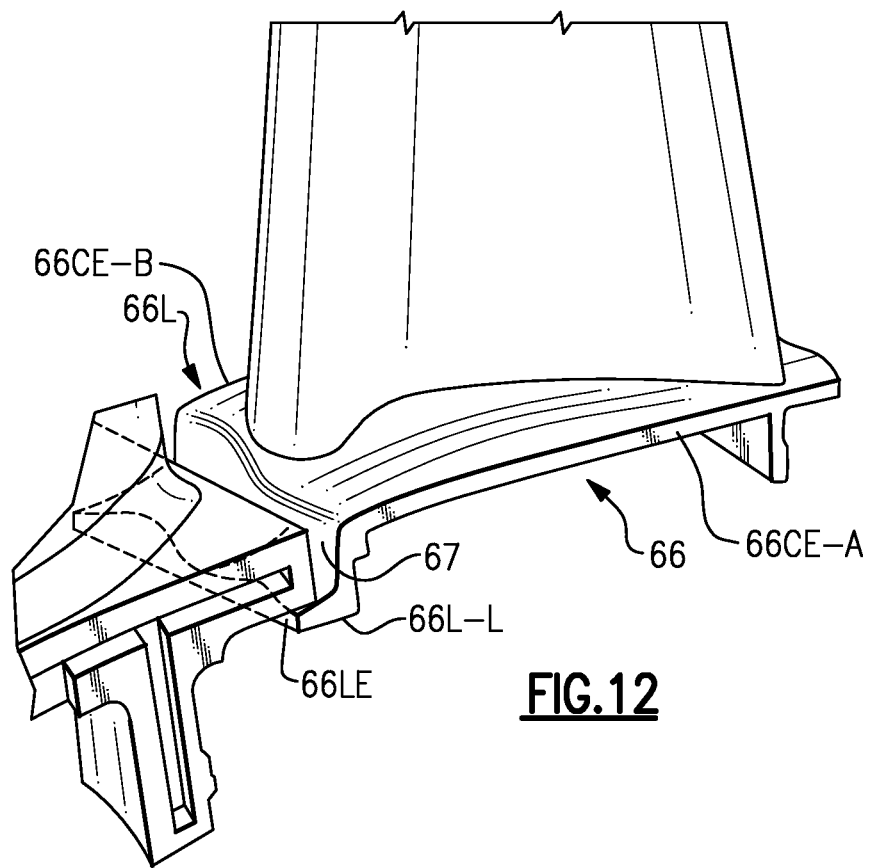
FIG. 12 is a schematic view of a stator vane portion with an axial non-axi-symmetric surface contour on a platform leading edge.

The platform 66 can include an intermediate face 67 extending in a radial direction and is spaced a distance from the leading and trailing edges 66LE, 66TE of the platform 66 (illustrated schematically in FIGS. 8-12). In some embodiments, the intermediate face 67 includes a non-axisymmetric surface contour. In one embodiment, the intermediate face 67 includes a non-axisymmetric surface contour in an axial direction (FIG. 12). In other embodiments, the platform 66 includes a non-axisymmetric surface contour extending from the intermediate face 67 (FIGS. 8 and 9). In further embodiments, the platform 66 includes a non-axisymmetric surface contour extending from said intermediate face 67 to define a portion of the core flow path.

Referring to FIG. 12, the leading portion 66L may also be contoured in an axial direction on a leading edge 66LE. The leading edge 66LE may, in one non-limiting embodiment, be contoured to provide a non-axisymmetric surface such as a waveform surface. Alternatively, or in addition thereto, the trailing edge portion 66TE may be contoured in an axial direction to provide a non-axisymmetric surface such as a waveform surface.

It should be understood that the non-axisymmetric radial surface contour undersurface 66T-L of the trailing portion 66T, the non-axisymmetric radial surface contour undersurface 66L-L of the leading portion 66L, the non-axisymmetric axial surface contour of the trailing edge 66TE, and the non-axisymmetric axial surface contour of the leading edge 66LE may be combined in various manners in relation to the hot combustion products to reduce purge-flow requirements and also reduce aerodynamic losses. Furthermore, features of the non-axisymmetric radial and/or axial surface contour of the blade platform section 66 and features of the non-axisymmetric radial and/or axial surface contour of the inner vane platform 44 may be combined in various manners to further reduce purge-flow requirements and aerodynamic losses.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a compressor section;
a combustor section; and
a turbine section,
said turbine section including at least one stator vane and at least one rotating blade,
said at least one stator vane including an inner vane platform section, said inner vane platform section having a leading edge, a trailing edge, and two circumferentially spaced edges, and
said at least one rotating blade including a root section, an airfoil section, and a rotor platform section between said root section and said airfoil section, said rotor platform having a leading edge, a trailing edge, and two circumferentially spaced edges;
wherein said at least one stator vane and said at least one rotating blade define a clearance gap in a radial direction between an upper surface of one of said inner vane platform section and said rotor platform section and an undersurface of the other one of said inner vane platform section and said rotor platform section;
wherein at least one of said rotor platform section and said inner vane platform section has a non-axisymmetric surface contour on a surface defining a portion of said clearance gap, said surface contour being curved and non-axisymmetric about an axis defined extending from the leading edge to the trailing edge of said at least one of said rotor platform section and said inner vane platform section, wherein said surface contour is designed to counteract non-uniform static pressure distortions engendered by combustion products flowing within said clearance gap.

2. The gas turbine engine of claim 1, wherein said non-axisymmetric surface contour is located on said undersurface of said at least one of said rotor platform section and said inner vane platform section.

3. The gas turbine engine of claim 2, wherein said undersurface is contoured in a radial direction.

4. The gas turbine engine of claim 2, wherein said undersurface is contoured in an axial direction.

5. The gas turbine engine of claim 1, wherein said turbine section includes a plurality of circumferentially spaced stator vanes and a plurality of circumferentially spaced rotating blades.

6. The gas turbine engine of claim 1, wherein said rotor platform includes a surface contoured in an axial direction.

7. The gas turbine engine of claim 1, wherein said rotor platform section includes a surface contoured in a radial direction.

8. The gas turbine engine of claim 1, wherein said non-axisymmetric surface contour is located on said upper surface of said rotor platform section.

9. The gas turbine engine of claim 8, wherein said non-axisymmetric surface contour is contoured in a radial direction.

10. The gas turbine engine of claim 8, wherein said rotor platform includes a surface contoured in an axial direction.

11. The gas turbine engine of claim 1, wherein said non-axisymmetric surface contour defines a portion of a core flow path.

12. The gas turbine engine of claim 1, wherein said non-axisymmetric surface contour defines a vertical face located along a trailing edge of said rotor platform section.

13. The gas turbine engine of claim 12, wherein said non-axisymmetric surface contour is contoured in an axial direction.

14. The gas turbine engine of claim 1, wherein said non-axisymmetric surface contour defines a vertical face located along a leading edge of said rotor platform section.

15. The gas turbine engine of claim 14, wherein said non-axisymmetric surface contour is contoured in an axial direction.

16. The gas turbine engine of claim 1, wherein said non-axisymmetric surface contour is a first non-axisymmetric surface contour being contoured in a radial direction, and wherein said platform includes a second non-axisymmetric surface contour being contoured in an axial direction.

17. The gas turbine engine of claim 16, wherein said first and second non-axisymmetric surface contours are both located on one of a leading portion and a trailing portion of said rotor platform section.

18. The gas turbine engine of claim 1, wherein said rotor platform section includes an intermediate face extending in a radial direction and positioned between said leading edge and said trailing edge of said rotor platform section.

19. The gas turbine engine of claim 18, wherein said non-axisymmetric surface contour is located on said intermediate face.

20. The gas turbine engine of claim 19, wherein said rotor platform section includes a second non-axisymmetric surface contour.

21. The gas turbine engine of claim 1, wherein said inner vane platform section and said rotor platform section overlap each other in an axial direction.

22. The gas turbine engine of claim 1, wherein said non-axisymmetric surface contour includes at least one concave segment.

23. The gas turbine engine of claim 1, wherein said non-axisymmetric surface contour includes at least two convex segments.

\* \* \* \* \*

UNITED STATES PATENT AND TRADEMARK OFFICE
CERTIFICATE OF CORRECTION

PATENT NO. : 9,976,433 B2  
APPLICATION NO. : 12/753211  
DATED : May 22, 2018  
INVENTOR(S) : Thomas J. Praisner and Eric A. Grover Page 1 of 1

It is certified that error appears in the above-identified patent and that said Letters Patent is hereby corrected as shown below:

In the Claims

In Claim 1, Column 6, Line 1; replace "said rotor platform" with --said rotor platform section--

In Claim 16, Column 6, Line 64; replace "said platform includes a second" with --said at least one of said rotor platform section and said inner vane platform section includes a second--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*